United States Patent
Gagliardi

(10) Patent No.: US 9,798,557 B2
(45) Date of Patent: Oct. 24, 2017

(54) INJECTION OF UPDATED CLASSES FOR A JAVA AGENT

(75) Inventor: Marco Gagliardi, Brisbane (CA)

(73) Assignee: CA, Inc., New York, NY (US)

( * ) Notice: Subject to any disclaimer, the term of this patent is extended or adjusted under 35 U.S.C. 154(b) by 266 days.

(21) Appl. No.: 13/594,700

(22) Filed: Aug. 24, 2012

(65) Prior Publication Data

US 2014/0059527 A1 Feb. 27, 2014

(51) Int. Cl.
*G06F 9/44* (2006.01)
*G06F 9/445* (2006.01)

(52) U.S. Cl.
CPC ............ *G06F 9/44521* (2013.01); *G06F 8/67* (2013.01)

(58) Field of Classification Search
None
See application file for complete search history.

(56) References Cited

U.S. PATENT DOCUMENTS

| | | | |
|---|---|---|---|
| 6,260,187 B1 | 7/2001 | Cirne | |
| 6,272,674 B1 | 8/2001 | Holiday | |
| 6,421,739 B1 | 7/2002 | Holiday | |
| 6,629,315 B1* | 9/2003 | Naylor | G06F 8/67 713/100 |
| 7,047,448 B2 | 5/2006 | Rao | |
| 7,055,146 B1* | 5/2006 | Durr | G06F 9/44521 717/162 |
| 7,512,935 B1 | 3/2009 | Cobb | |
| 8,533,687 B1* | 9/2013 | Greifeneder et al. | 717/130 |
| 2002/0049963 A1* | 4/2002 | Beck et al. | 717/130 |
| 2003/0084434 A1* | 5/2003 | Ren | 717/172 |
| 2003/0149960 A1* | 8/2003 | Inamdar | 717/118 |
| 2004/0015936 A1 | 1/2004 | Susarla et al. | |
| 2004/0243994 A1 | 12/2004 | Nasu | |
| 2004/0255290 A1* | 12/2004 | Bates et al. | 717/174 |
| 2005/0039171 A1* | 2/2005 | Avakian et al. | 717/127 |
| 2005/0132351 A1 | 6/2005 | Randall | |
| 2005/0268296 A1 | 12/2005 | Marolia | |
| 2007/0106716 A1* | 5/2007 | Corrie | 707/206 |
| 2007/0168998 A1* | 7/2007 | Mehta et al. | 717/130 |
| 2007/0294684 A1 | 12/2007 | Kumashiro | |
| 2008/0016504 A1* | 1/2008 | Cheng | G06F 8/65 717/168 |
| 2008/0155526 A1 | 6/2008 | Gokhale | |
| 2008/0276227 A1* | 11/2008 | Greifeneder | 717/130 |
| 2009/0037360 A1* | 2/2009 | Melamed | 706/47 |
| 2009/0249322 A1 | 10/2009 | Sugiyama | |
| 2011/0225577 A1 | 9/2011 | Wookey | |
| 2011/0283256 A1* | 11/2011 | Raundahl Gregersen | G06F 8/67 717/108 |

(Continued)

OTHER PUBLICATIONS

Java Instrumentation API, Mar. 1, 2012, retrieved from: http://web.archive.org/web/20120301021428/http://docs.oracle.com/javase/7/docs/api/java/lang/instrument/Instrumentation.html.*

(Continued)

*Primary Examiner* — Jue Louie
(74) *Attorney, Agent, or Firm* — Vierra Magen Marcus LLP

(57) ABSTRACT

Technology is disclosed for updating an Agent. One embodiment comprises running the Agent for the Application while the Application is also running. The Agent is associated with an identified source of code for the Agent. The code for the Agent is updated, and the updated Agent is run with the Application.

27 Claims, 11 Drawing Sheets

(56) References Cited

U.S. PATENT DOCUMENTS

| | | | |
|---|---|---|---|
| 2011/0283265 A1 | 11/2011 | Gagliardi et al. | |
| 2013/0263096 A1* | 10/2013 | Hulick | 717/130 |
| 2013/0339926 A1* | 12/2013 | Raundahl Gregersen et al. | 717/114 |
| 2014/0026121 A1* | 1/2014 | Jackson et al. | 717/124 |
| 2014/0059528 A1 | 2/2014 | Gagliardi | |

OTHER PUBLICATIONS

Liang et al. "Dynamic Class Loading in the Java Virtual Machine", 1998, OOPSLA '98, Proceedings of the 13th ACM SIGPLAN conference on Object-oriented programming, systems, languages, and applications, pp. 36-44.*

Extended European Search Report dated Dec. 20, 2013 in European Patent Application No. 13181318.0, 41 pages.

Volker Simonis: ""We need a 'dirty hack' (but a brilliant one). . ." | Java.net", weblogs.java.net, Feb. 20, 2009, pp. 1-8,D XP055086307, Retrived from the Internet: URL:https://weblogs.java.net/blog/simonis/archive/2009/02/we_need_a_dirty. Html [retrieved on Oct. 31, 2013], 7 pages.

Rice: "java—Javaagent class unloading—Stack Overflow", Stackoverflow.com, Aug. 12, 2009, pp. 1-3, XP055087518, Retrived from the Internet: URL://http:stackoverflow.co m/questions/1248061/javaagent-classunloading [retrieved on Nov. 11, 2013], 3 pages.

Jari Arniala: "Instrumenting Java bytecode Seminar work for the Compilers-course, spring 2005", Seminar work for the Compilers-course, spring 2005, Apr. 8, 2005, pp. 1-8, XP055086340, Retrieved from the Internet: URL:http://www.cs.helsinki.fi/u/pohjalai/k05/okk/seminar/Aarnialainstrumenting.pdf [retrieved on Oct. 31, 2013], 8 pages.

Extended European Search Report dated Dec. 20, 2013 in European Patent Application No. 13181316.4, 49 pages.

Schwarz Don: "ONJava.com: Managing Component Dependencies Using ClassLoaders", O'Reilly on Java.com, Apr. 13, 2005, pp. 1-13, XP055086645, Retrieved from the Internet: URL:http://www.onjava.com/lpt/a/5795 [retrieved on Nov. 4, 2013], 13 pages.

Response to Extended European Search Report filed Aug. 26, 2014 in European Patent Application No. 13181318.0, 19 pages.

Response to Extended European Search Report filed Aug. 26, 2014 in European Patent Application No. 13181316.4, 15 pages.

Office Action dated Nov. 6, 2014 in U.S. Appl. No. 13/594,695, 24 pages.

Response to Office Action filed Jul. 23, 2015 in U.S. Appl. No. 13/594,695.

Response to Office Action filed Jun. 16, 2016 in U.S. Appl. No. 13/594,695.

Response to Office Action filed Feb. 7, 2015 in U.S. Appl. No. 13/594,695, 20 pages.

Office Action dated Apr. 23, 2015 in U.S. Appl. No. 13/594,695, 16 pages.

Office Action dated Mar. 4, 2016, in European Patent Application No. 13181318.0.

Office Action dated Feb. 16, 2016 in U.S. Appl. No. 13/594,695, filed Aug. 24, 2012.

Final Office Action mailed Sep. 22, 2016, in U.S. Appl. No. 13/594,695, filed Aug. 24, 2012.

Office Action mailed Aug. 10, 2016, in European Patent Application No. 13181316.4 filed Aug. 22, 2013.

Amendment filed Sep. 7, 2016, in European Patent Application No. 13181318.0 filed Aug. 22, 2013.

Anonymous, "Software agent—Wikipedia, the free encyclopedia", Jul. 19, 2012, Retrieved from the Internet: URL:https://web.archive.org/web/20120719060539/https://en.wikipedia.org/wiki/Software_agent.

Amendment filed Feb. 17, 2017, in European Patent Application No. 13181316.4 filed Aug. 22, 2013.

Amendment filed Mar. 21, 2017, in U.S. Appl. No. 13/594,695, filed Aug. 24, 2012.

* cited by examiner

INJECTION OF UPDATED CLASSES FOR A JAVA AGENT

BACKGROUND

The present disclosure relates to agent based technology for use with a Java Virtual Machine (JVM) and other analogous software environments.

In Java, a class represents the code to be executed. When a particular state is associated with a class, there exists an instance of that class. So different instances of the same class can have different state, but generally refer to the same code.

Source files (.java files) are compiled into (virtual) machine-readable class files which have a .class extension. Since Java is a platform-independent language, source code is compiled into an output file known as byte code, which is stored in the class file. If a source file has more than one class, each class is usually compiled into a separate class file. A JAR file (Java ARchive) is an archive file format typically used to aggregate many Java class files to distribute application software or libraries. JAR files are built on the ZIP file format and have the .jar file extension.

A JVM is the code execution component of the Java software platform. Class files can typically be loaded by any JVM. JVMs are available for many platforms, and the class file compiled for one platform should execute in a JVM of another platform. This makes Java platform-independent.

The Java Classloader is a part of the Java Runtime Environment that dynamically loads Java classes into the JVM. Usually, classes are loaded on demand. When the JVM is started, three classloaders are used: the Bootstrap Classloader, the Extensions Classloader and the System Classloader. The Bootstrap Classloader loads the core Java libraries.

The Java Instrumentation API provides a means to allow Java programming language Agents to instrument or otherwise act on programs running in the JVM. One mechanism for instrumentation is modification of the byte code of the methods of the Java class files. An Agent is deployed as a JAR file (the agent.jar file). An attribute in the JAR file manifest specifies the Agent class which will be loaded to start the Agent. For implementations that support a command-line interface, an Agent is started by specifying an option on the command-line. Implementations may also support a mechanism to initiate agents after the JVM has started. For example, an implementation may provide a mechanism that allows a tool to attach to a running application, and initiate the loading of the tool's Agent into the running application.

On implementations with a command-line interface, an Agent is started by adding the following option to the command-line:

-javaagent:jarpath[=options]

In the above command line option, jarpath is the path to the Agent's JAR file and options are the Agent options. This switch may be used multiple times on the same command-line, thus creating multiple Agents. More than one Agent may use the same jarpath. An Agent's JAR file conforms to the JAR file specification.

The manifest of the Agent's JAR file contains the attribute Premain-Class. The value of this attribute is the name of the Agent class. The Agent class implements a public static "premain" method similar in principle to the main application entry point. After the JVM has initialized, each "premain" method will be called in the order the Agents were specified, then the real application main method will be called. The Agent classes are loaded by the Bootstrap Classloader, which will lock the Agent's JAR file so that the code in the Agent's JAR file cannot normally be changed.

BRIEF SUMMARY

According to one aspect of the present disclosure, technology for updating an Agent is disclosed. One embodiment comprises running the Agent for the Application while the Application is running. The Agent is associated with an identified source of code for the Agent that is locked. Code for the Agent is updated while the identified source of code for the Agent is locked. The updated Agent is run with the Application.

One embodiment comprises running a Java Application in a Java Virtual Machine, running an Agent in the Java Virtual Machine while the Application is running, updating the Agent without re-starting the Application and the Java Virtual Machine, and running the updated Agent with the Application.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

Figure 1:
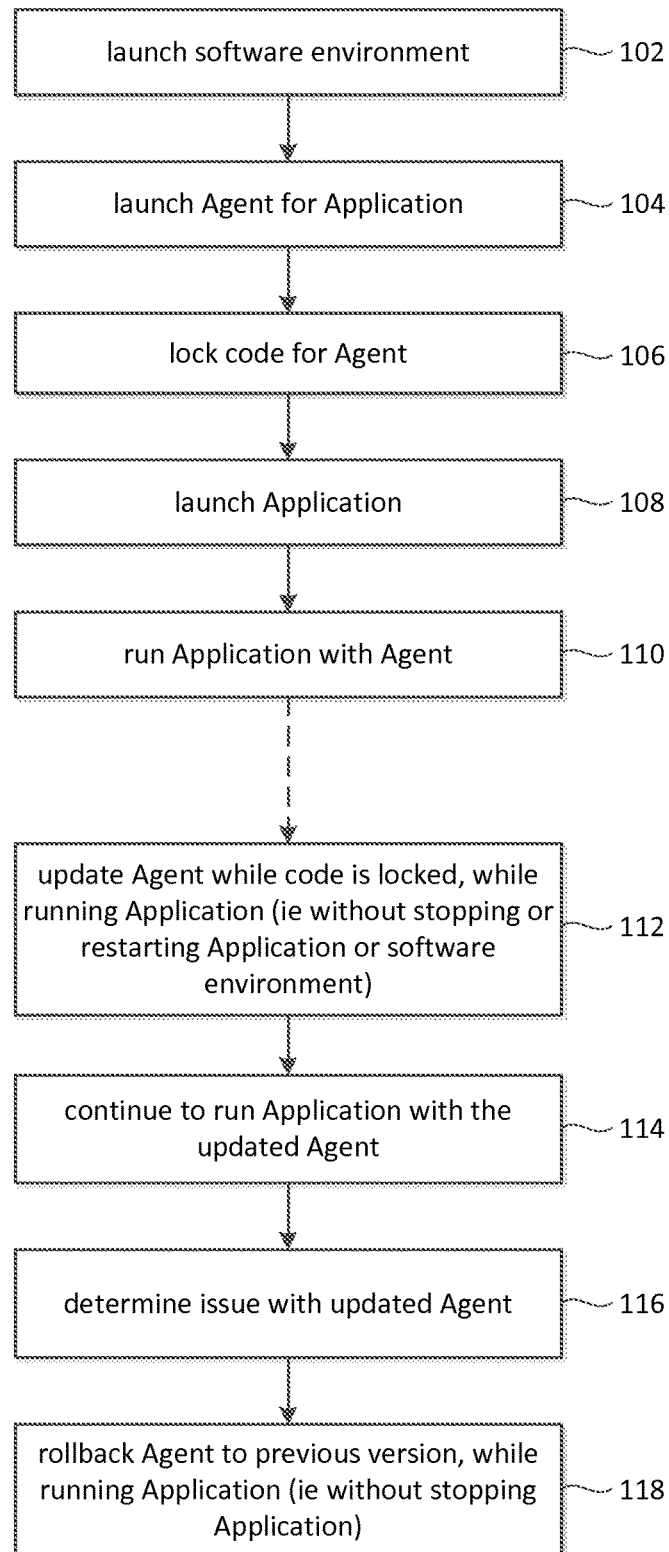
FIG. 1 is a flow chart describing one embodiment of a process for managing versions of an Agent for an Application.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Technology is disclosed herein for updating an Agent, such as an Agent for a JAVA Application running in a JVM. The Agent is associated with an identified source of code for the Agent (e.g., an Agent jar file). The code for the Agent can be updated while the source of code for the Agent is locked, while the JVM is running and/or while the Application is running.

FIG. 1 is a flowchart describing one embodiment of a high level process for managing versions of an Agent for an Application. In block 102, a software environment is launched. For example, if an Application is written in the Java programming language, then block 102 can include launching the Java runtime environment and/or launching the. In block 104, an Agent, to be used in conjunction with the Application, is launched. In block 106, code for that Agent is locked. For example, if the code is stored in a file, that file can be locked to prevent other processes from accessing and/or changing the code in that file. In block 108, the Application is launched. In block 110, the Application and Agent are both run within the software embodiment that was launched in block 102. In some embodiments, the Application can be launched prior to the Agent or at the same time as the Agent.

In block 112, the Agent is updated while the code for the Agent remains locked (see block 106). Additionally, the Application and software environment continue to run while the Agent is updated. For example, the Agent can be updated without stopping or restarting the Application or software environment. Note that the arrow between block 110 and 112 is dashed to indicate that these two blocks may not happen right after each other and that many other functions may occur between these two blocks. In block 114, the system continues to run the Application along with the updated Agent. In block 116, it is determined that there is an issue or a problem with the updated Agent. Therefore, in block 118, the Agent is rolled back to use a previous version of code for the Agent, while continuing to run the Application (i.e. without stopping the Application or restarting the Application), and while continuing to run the software environment (i.e. without stopping and/or restarting the software environment).

Figure 2:
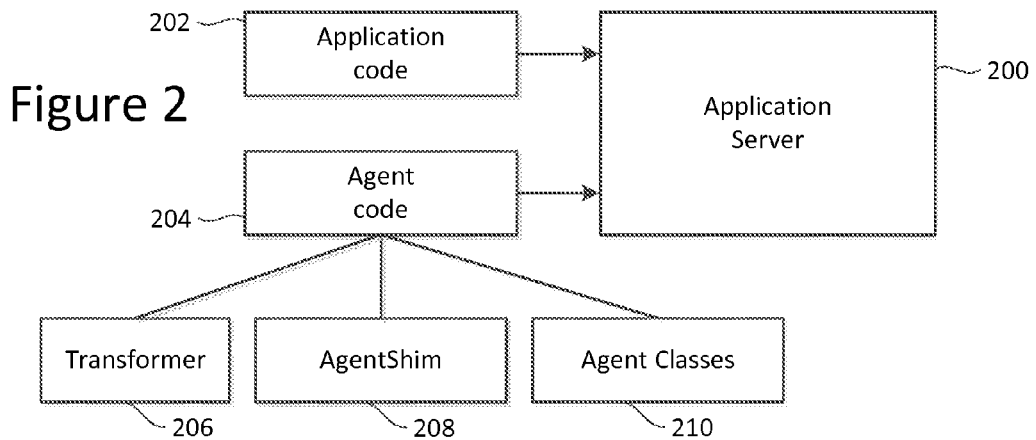
FIG. 2 is a block diagram depicting one embodiment of a system that can use an Agent.

FIG. 2 is a block diagram depicting one embodiment of a system that can use an Agent, as described herein. FIG. 2 shows Application Server 200 which is a standard Application Server known in the art. In alternative embodiments, Application Server 200 can include multiple Application Servers that are load balanced, one or more Application Servers in conjunction with one or more Web Servers, or other types of servers. Application Server 200 receives Application code 202, which is code used to implement the Application. Application Server 200 may also receive Agent code 204, which includes code to implement the Agent. In one embodiment, Agent code 204 comprises code to implement a transformer 206, code to implement an AgentShim 208 and code to implement Agent Classes 210. In one embodiment, a Shim is a unit of code that intercepts or receives an invocation of a function (e.g. a method, procedure, etc.) and redirects that invocation elsewhere. More details of the AgentShim 208 will be provided below.

Figure 3:
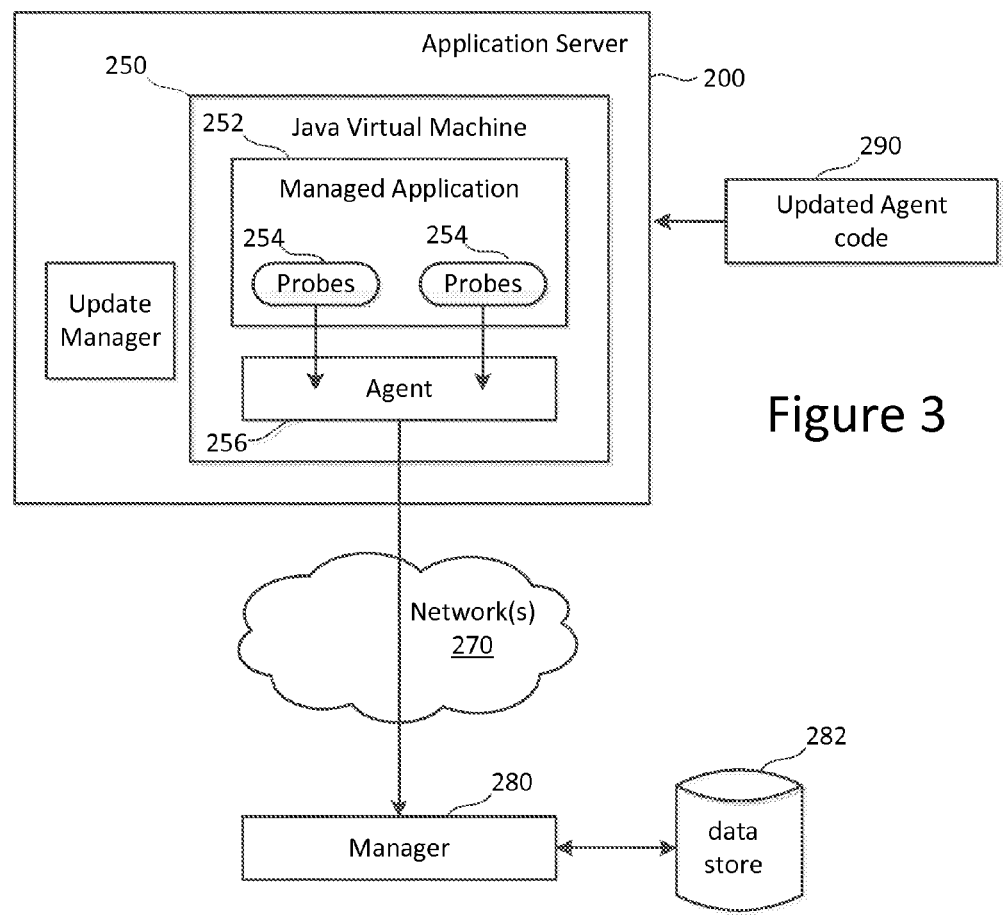
FIG. 3 is a block diagram depicting one example of a system with an Agent deployed.

In one embodiment, the technology described herein can be deployed in a Java runtime environment. However, the technology described herein can be used with other software environments in addition to Java. FIG. 3 is a block diagram depicting one example of a system with an Agent deployed in a Java runtime environment. The system of FIG. 3 assumes that Transformer 206 of Agent code 204 of FIG. 2 (and/or other code) is used to instrument the Application (Application code 202) to create a managed Application running within the JVM. As such, FIG. 3 shows Application server 200 implementing JVM 250. Running within JVM 250 is the managed Application 252. Application code 202 for the managed Application 252 is instrumented to include probes 254 which invoke various methods of Agent 256. Note that Agent 256 is implemented using Agent code 204 of FIG. 2. In one embodiment, Agent 256 can be used to monitor performance of managed Application 252 and send performance data to Manager 280, which will store the performance data in data store 282. Agent 256 can communicate with Manager 280 via one or more networks 270, which can include the Internet, a LAN, a WAN, wireless or other type of network. More details of a system that includes managed Applications and Agents in the configuration of FIG. 3 can be found in the following patents, which are incorporated by reference in their entirety: U.S. Pat. No. 7,225,361; U.S. Pat. No. 7,234,080; U.S. Pat. No. 7,310,777; and U.S. Pat. No. 7,870,431.

Agents that perform functions other than performance monitoring can also be used with the technology described herein. No particular function for an Agent is required. In one embodiment, an Agent can be anything that makes use of the -javaagent option of the Java Instrumentation API. In such an embodiment, the class flies for the Agent would be stored in a jar file. In another embodiment, an Agent can be a process that manages another process on behalf of a third process or acts on behalf of a third process.

As discussed above, technology is provided herein for managing versions of the Agent. In that regard, FIG. 3 shows an Update Manager 260, which can be software that runs outside the JVM 250 or inside the JVM 250. Update Manager 260 can be used to cause Agent 256 to be updated or rolled back while continuing to run JVM 250 and/or Managed Application 252 (i.e. without stopping and/or having to restart JVM 250 and/or managed Application 252). FIG. 3 also shows updated Agent code 290, which can be used to update Agent 256. In one embodiment, updated Agent code 290 include a new transformer, new AgentShim, and/or new Agent Classes.

Figure 4:
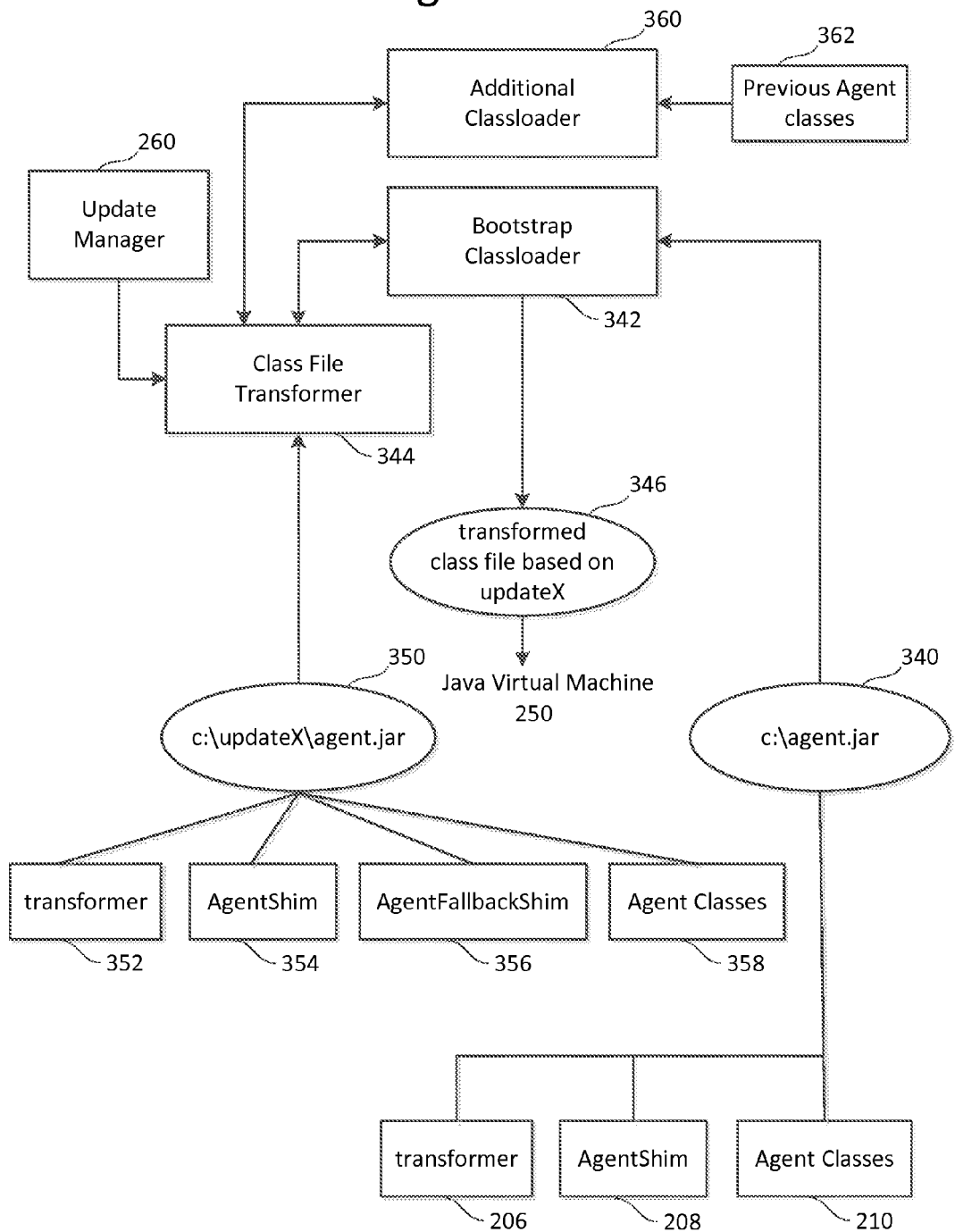
FIG. 4 is a block diagram depicting one example of the components in a Java system that can use and manage versions of an Agent.

FIG. 4 is a block diagram depicting one example of the components in a Java system running in Application Server 200 that are involved with updating or rolling back Agent 256. The jar file 340 containing the Agent class files is referred to as agent.jar 340. The class path for agent.jar is "C:\agent.jar." agent.jar 340 is one example of Agent code 204 from FIG. 2, and includes code for a transformer 206, code for an AgentShim 208 and code for Agent Classes 210. The Java Bootstrap Classloader 342 will access the code from agent.jar 340, in order to load the one or more classes in agent.jar into JVM 250. In general, when using the configuration described herein, Bootstrap Classloader 342 loads code and provides that loaded code to Class File Transformer 344. In one embodiment, Class File Transformer 344 will have the option to instrument the code provided to it from the Bootstrap Classloader 342 and then return the instrumented code back to Bootstrap Classloader 342 for presentation to the Java Virtual Machine 250. In some embodiments, additional Classloaders can be used in lieu of or in addition to the Bootstrap Classloader 342.

FIG. 4 shows Update Manager 260, which instructs Class File Transformer 344 when to update and when to roll back the Agent. When updating the Agent, the updated class files are stored in another version of agent.jar. However, this agent.jar has to be stored in a different location than the original agent.jar. Therefore, in one embodiment, one or more update directories are created. For example, the updated agent.jar 350 can be stored in C:\updateX\. In one embodiment, the updated agent.jar will include a new transformer 352, a new AgentShim 354, a FallbackAgentShim 356 and new Agent classes 358. In some embodiments, a subset of the transformer 352, AgentShim 354, AgentFallbackShim 356 and Agent Classes 358 are new with the remaining portions being old. When Update Manager 260 instructs Class File Transformer 344 to update the Agent, Class File Transformer 344 will request that the JVM reload the class files for the Agent. In response to request to reload the class files for the Agent, Bootstrap Classloader 342 will access the class files from agent.jar 340 and present the class files to Class File Transformer 344. Class File Transformer 344 will replace the class files from agent.jar with code (class files) from the updated agent.jar 350 and return the updated class files 346 to Bootstrap Classloader 342, which will present the updated code to the Java Virtual Machine. When Bootstrap Classloader 342 receives the updated class files, it thinks its receiving an instrumented version of the original Agent class files, rather than a replaced version. In this manner, the class files from the class path C:\agentjar are replaced with class files from a file outside of the class path (i.e. from C:\updateX\agentjar). In one embodiment, there can be multiple update directories and Update Manager 260 will indicate to Class File Transformer 344 which update directory to take the updated files from. In some alternative embodiments, the developer of the Application can implement additional classloaders (ie such as Additional Classloader 360) to replace Bootstrap Classloader 342. Additionally, in other embodiments, the system can include multiple Class File Transformers.

In order to enable one embodiment for rolling back the Agent to a previous version, the updated agent.jar will include the new AgentShim 354 and the new AgentFallbackShim 356. The new AgentShim 354 will have code that invokes the various Agent Classes 358. Thus, an Application is instrumented to include invocations to AgentShim 354, which will redirects those invocations to the appropriate methods of Agent classes 358. AgentFallbackShim 356 will include redirections to Agent classes for previous Agents. For example, FIG. 4 shows previous Agent Classes 362 for a previous version of the Agent. Class File Transformer 344, as part of updating the Agent, will instruct Additional Classloader 360 (different from the Bootstrap Classloader 342 or any other Classloader that was loading Agent Classes 358) to load the previous Agent classes 362. Because the previous Agent classes 362 will have the same package names as Agent classes 358, they have to be loaded by different classloaders so that they are in different name spaces. In order to do a hot roll back of the Agent, the system will replace the loaded AgentShim 354 with the loaded AgentFallbackShim 356 so that the Application will be accessing the previous Agent classes 362 rather than the updated Agent classes 358. This way Update Manager 260 can roll back from Agent classes 358 to previous Agent classes 362.

Figure 5:
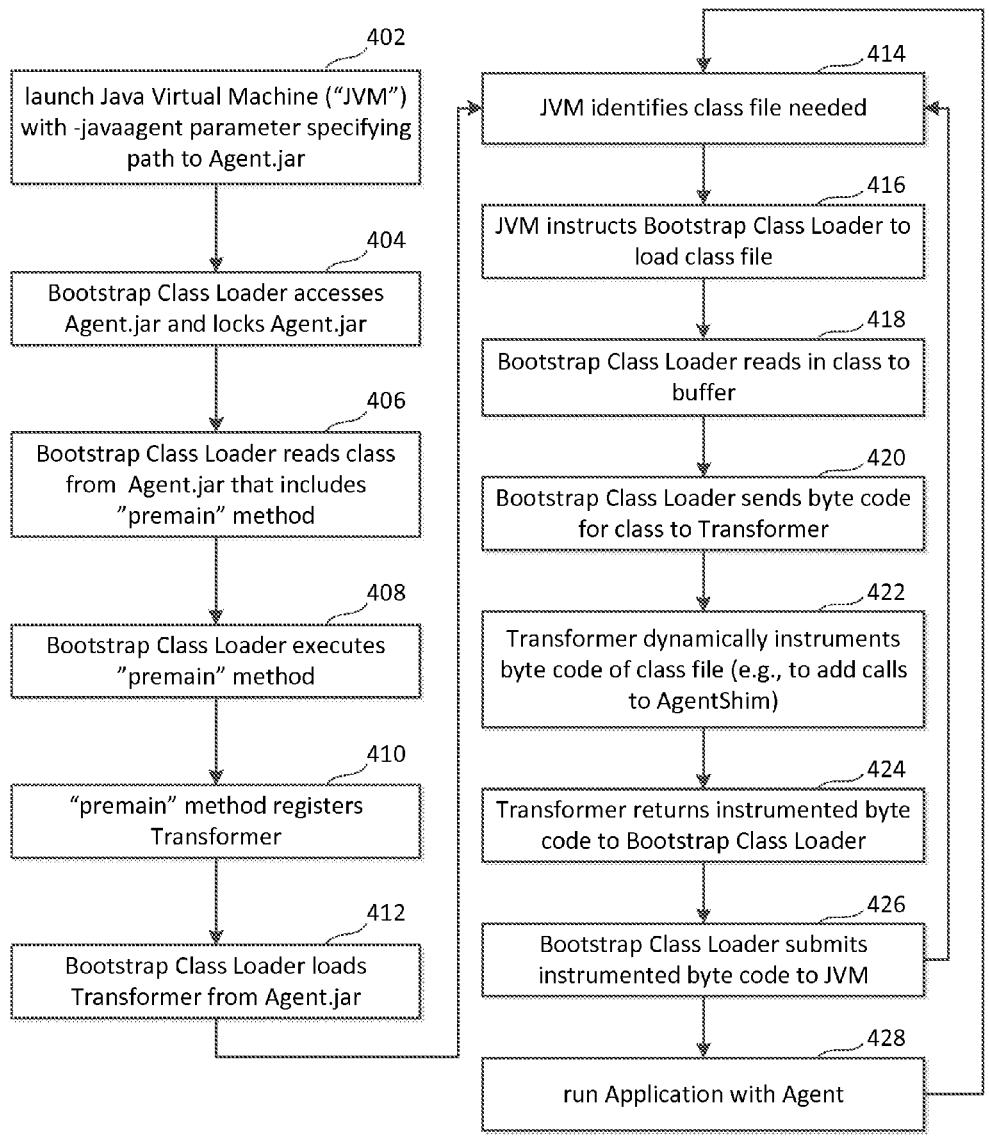
FIG. 5 is a flow chart describing one embodiment of a process for deploying an Agent for an Application running in a JVM.
Figure 6:
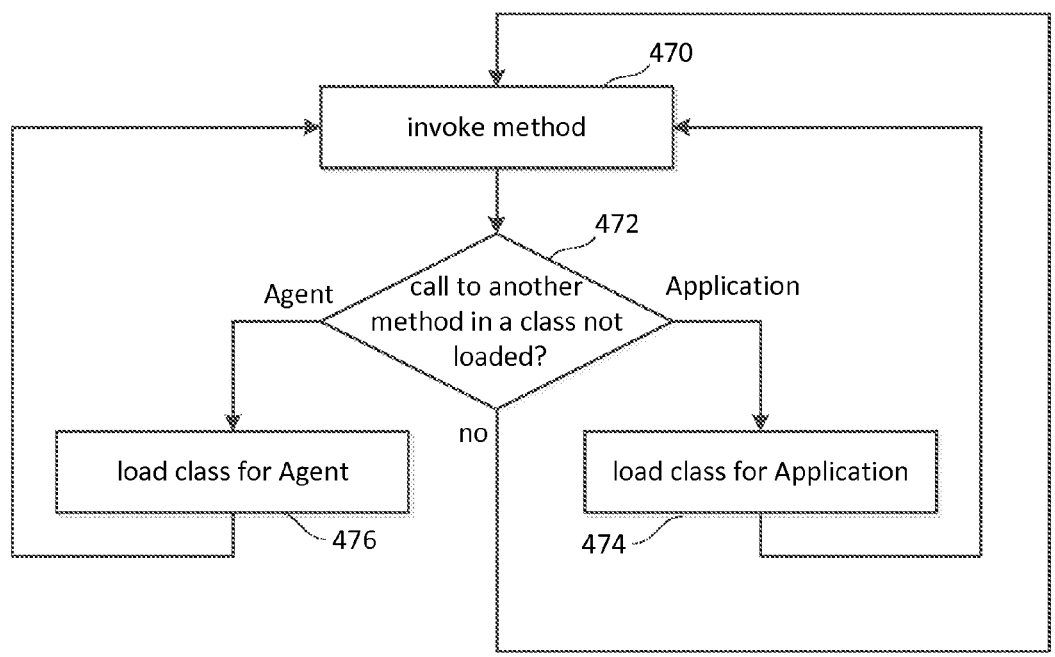
FIG. 6 is a flow chart describing one embodiment of a process for running an Application and an Agent.
Figure 7A:
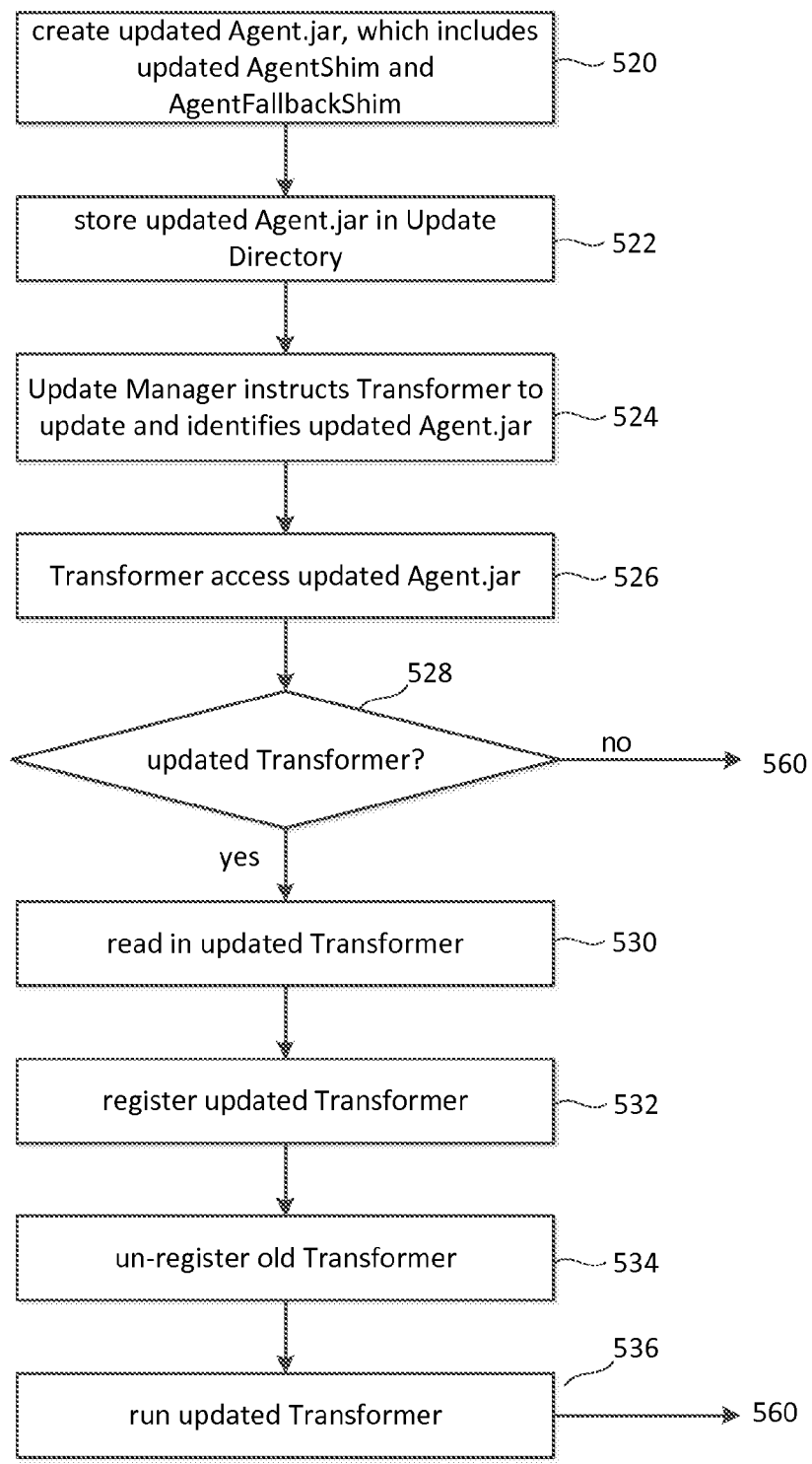
FIGS. 7A and 7B, together, depict a flow chart describing one embodiment of a process for updating an Agent.
Figure 7B:
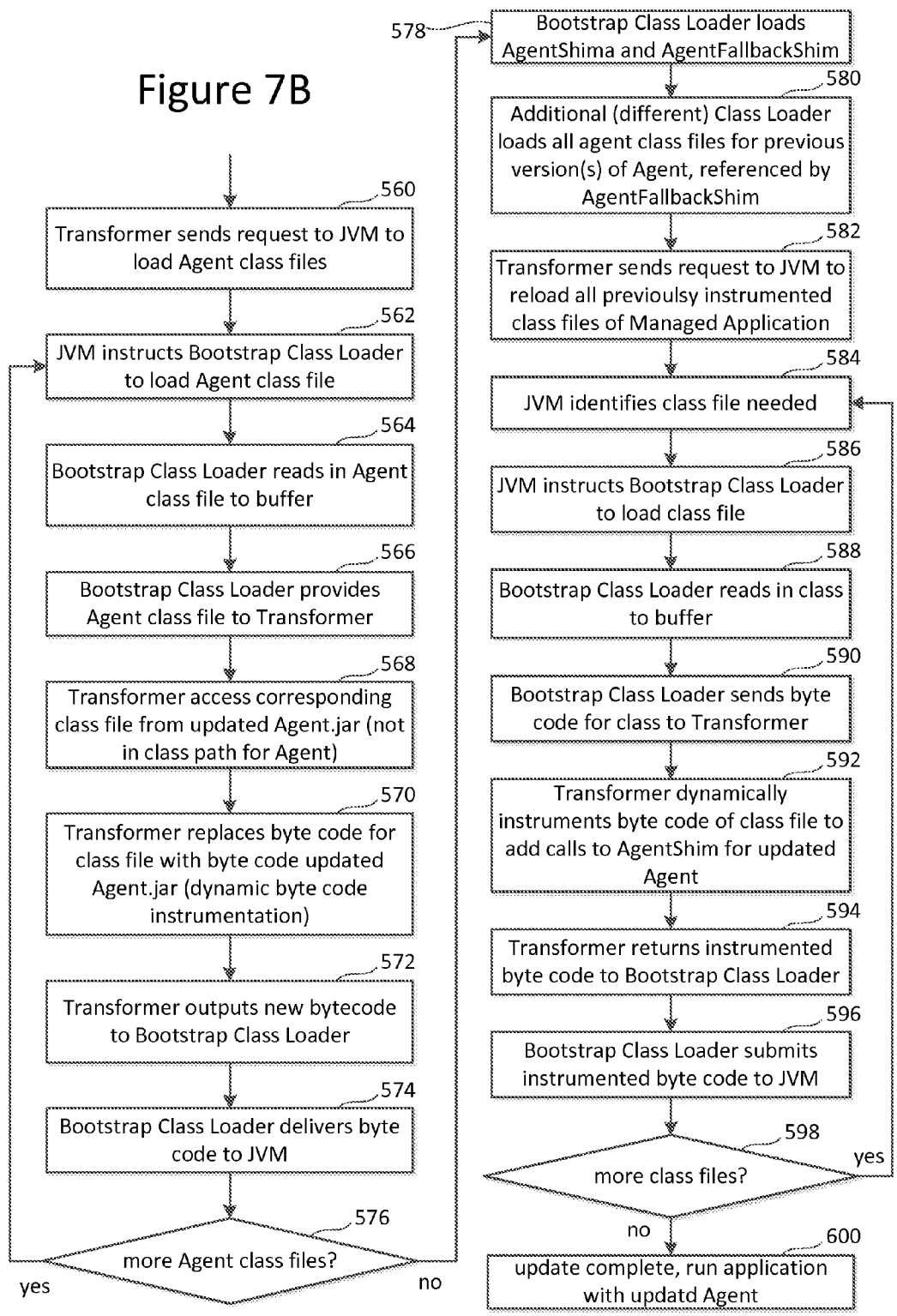
Figure 8:
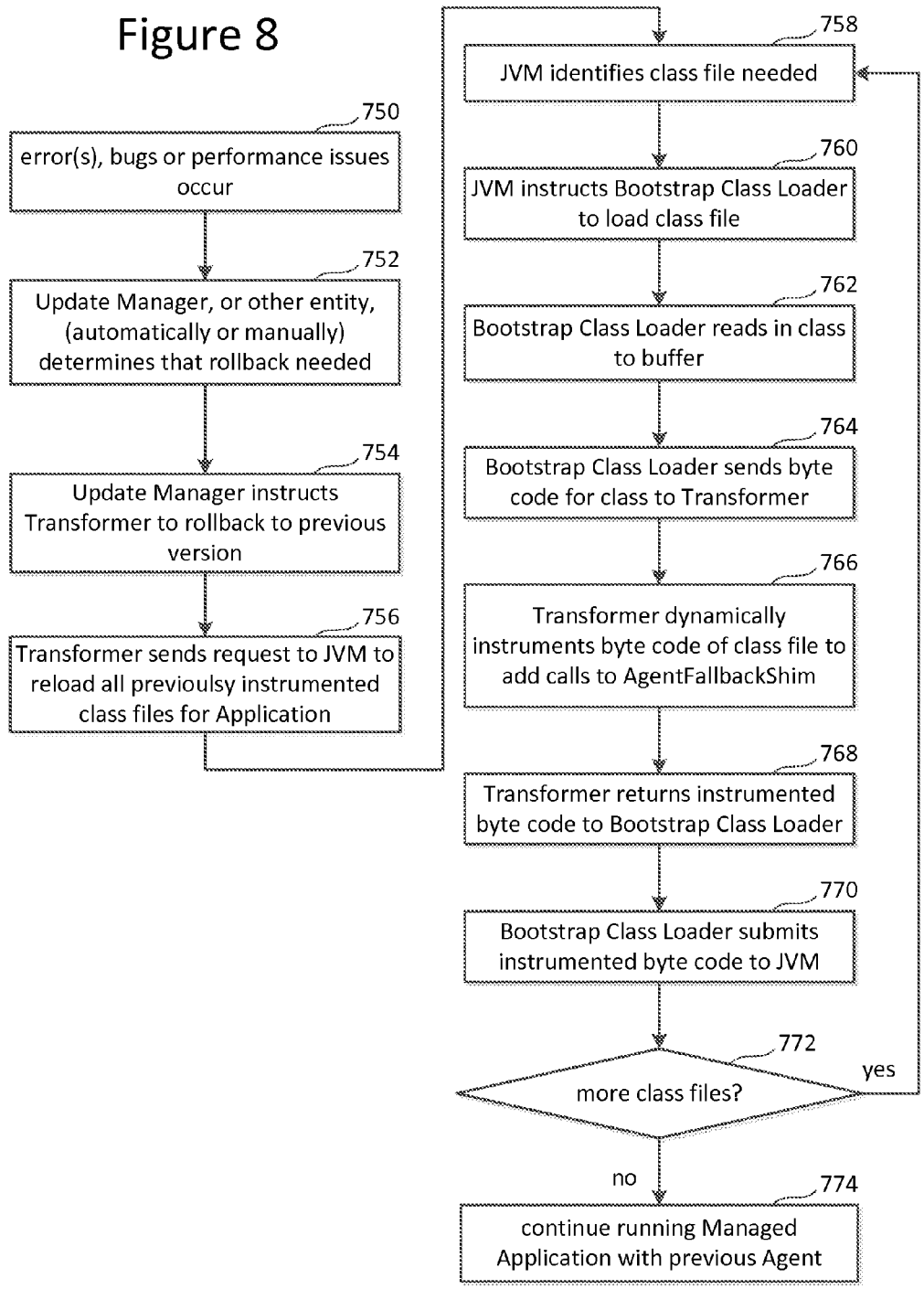
FIG. 8 is a flow chart describing one embodiment of a process for rolling back an Agent to use a previous version of the code for an Agent.

FIGS. 5, 6, 7A, 7B and 8 are flowcharts which describe more details for managing the versions of an Agent that is implemented using the -javaagent option of the Java Instrumentation API according to the embodiments of FIGS. 2-4. In that regard, the flowchart of FIG. 5 provides more details of one embodiment of blocks 102-110 of FIG. 1. FIG. 7A-7B describe a flowchart providing more details of one embodiment of block 112 of FIG. 1. FIG. 8 provides more details of one embodiment of block 118 of FIG. 1.

Block 402 at FIG. 5 includes launching the JVM with the -javaagent parameter specifying the class path to agent.jar. In block 404, Bootstrap Classloader 342 (see FIG. 4) accesses agent.jar and lock agent.jar. By locking agent.jar, it is meant that no other process can change the contents of agent.jar. In some embodiments, locking agent.jar can prevent any other process or entity from accessing agent.jar. In block 406, Bootstrap Classloader 342 reads the class from agent.jar that includes the "premain" method. In block 408, Bootstrap Classloader 342 executes the "premain" method. In block 410, the "premain" method registers Class File Transformer 344 with Bootstrap Classloader 342. In block 412, Bootstrap Classloader 342 load transformer 206 from agent.jar 340 to be implemented as a Class File Transformer 344. In block 414, the JVM identify a class files needed for Application 252. In block 416, the JVM instructs Bootstrap Classloader 342 to load the class file needed. In block 418, Bootstrap Classloader 342 reads in the Application into a buffer. In block 420, the Bootstrap Classloader 342 provide the byte code for the class read into the buffer to Class File Transformer 344 (because that Class File Transformer was registered in block 410). In block 422, Class File Transformer 344 dynamically instruments the byte code for the class file. For example, Class File Transformer 344 adds invocations to methods in AgentShim 208. In block 424, Class File Transformer 344 returns the instrumented code to Bootstrap Classloader 342. In block 426, Bootstrap Classloader 342 submits the instrumented code to the JVM 250. There is an arrow running from block 426 back to block 414 because it is possible that blocks 414-426 may need to be repeated multiple times because the JVM will need to load multiple class files to run the Application. Once the appropriate class files have their byte code instrumented, the Application is now a managed Application. In block 428, the managed Application is run with the Agent.

FIG. 6 is a flowchart describing more details of running the Application with the Agent (block 428 of FIG. 5). In block 470 of FIG. 6, the JVM invokes a method. If this invocation is a call to a method that is in a class not already loaded in the JVM, then that class will need to be loaded. If the class that needs to be loaded is for the Application (e.g. Application code 202), then the class will be loaded from the Application in block 474. If the class that needs to be loaded is for the Agent (e.g. Agent code 204), then the class will be loaded from the Agent in block 476. After blocks 474 and 476, the process continues back at block 470. Thus, the first time an invocation of a class in AgentShim is invoked, the AgentShim 208 will need to be loaded (if it is not already loaded). When invocations are redirected to the Agent Classes 210, the additional Agent Classes 210 will be loaded. The process of FIG. 6 can continue throughout the running of Application. When a class file is loaded, as explained herein, the Class File may be instrumented by the Class File Transformer 344. If the invocation of the method in block 470 is a call to a method that is in a class that is loaded in the JVM, then that class will not need to be loaded.

FIG. 7A-7B depict a flowchart providing more details for updating an Agent while the agent.jar 340 in the class path (c:\agent.jar) is locked, while the managed Application continues to run (without stopping or restarting the Application) and while the JVM continues to run (without stopping or restarting the JVM). In block 520, an automated process or a human creates an updated agent.jar which includes the updated AgentShim 354, the updated AgentFallbackShim 356, and the updated Agent Class files 358. In block 522, the new agent.jar file is stored in the update directory (e.g. c:\updateX\). In one embodiment, blocks 520 and 522 are performed by a human. In other embodiments, blocks 520 and 522 can be performed by an automated process (e.g. software). In block 524, Update Manager 260 instructs Class File Transformer 344 to update the Agent and identifies the update. For example, Update Manager 260 informs Class File Transformer 344 of the update directory or use another means to identify which of multiple possible updates to use. In one embodiment, a human operator instructs Update Manager 260 to contact Class File Transformer 344. In another embodiment, an automated process instructs Update Manager 260 to make the contact with Class File Transformer 344 or Update Manager 260 monitors the update directories and automatically contact Class File Transformer 344 upon a new agent.jar being saved in the update directories.

In block 526, Class File Transformer 344 accesses the updated agent.jar. If Class File Transformer 344 sees a new Class File Transformer (e.g. Class File Transformer 352) in the updated agent.jar, then blocks 530-536 will be performed to update the Class File Transformer. Otherwise, the process will skip to block 560 (see FIG. 7B).

Updating the Class File Transformer starts at block 530, which includes reading in the updated code for the new Class File Transformer. In block 532, the new Class File Transformer is registered with the JVM (see block 410 of FIG. 5). In block 534, the existing Class File Transformer (also known as the old Class File Transformer) is unregistered from the JVM. In block 536, the new Class File Transformer (the updated transformer) is executed or otherwise run. After block 536, the process continues at block 560 of FIG. 7B.

In block 560 (see FIG. 7B), Class File Transformer 344 sends a request to the JVM to load the Agent Class files. It is likely that the Agent Class files have already been loaded, so this is an explicit request to reload the class files for purposes of performing dynamic instrumentation of the byte code for the class files of the Agent. In block 562, the JVM instructs the Bootstrap Classloader 342 to load one of the Agent Class files. In block 564, the Bootstrap Classloader 342 reads in one of the Agent Class files from the (original agent.jar file 340) to the buffer. In block 566, the Bootstrap Classloader 342 provides that Agent Class file to the current Class File Transformer 344. In block 568, the current Class File Transformer 344 accesses the corresponding class file from the updated agent.jar (which is not in the class path for the Agent), such as from Agent Classes 358. In block 570, Class File Transformer 344 replaces the byte code for the old Agent (ie from agentjar 340) with replacement byte code from the updated Agent (ie from update\agent.jar 350), thereby, performing dynamic byte code instrumentation. In block 572, the Class File Transformer 344 outputs the new/instrumented byte code to Bootstrap Classloader 342. In block 574, Bootstrap Classloader 342 delivers the byte code to JVM 250. If there are more class files in the Agent that need to be loaded, the process will loop back to block 562; otherwise, the process will continue at block 578.

In block 578, Bootstrap Classloader 342 loads the AgentShim 354 and AgentFallbackShim 356 from the updated agent.jar. In block 580, Class File Transformer 344 instructs the Additional Classloader 360 to load Previous Agent Classes 362, which (in some embodiments) includes all (or a subset of) the agent class files for a previous version of an Agent. Specifically, block 580 may include Class File Transformer 344 instructing Additional Classloader 360 to load those class files having methods invoked by AgentFallbackShim 356. It is possible (in some embodiments) that the class files for the previous version will be some class files from one previous version and some class files from another previous version. In another embodiment, all the class files are from the same previous version. Block 580 uses the Additional Classloader 360 (rather than the Bootstrap Classloader 342 or the other Classloader being used for the Agent Classes 358), so that previous Agent Classes 362 are in a different name space than Agent Classes 358. Note that block 580 includes performing the functions of blocks 562-576 for Previous Agent Classes 362. The class files for a previous version of the Agent have been loaded by the Additional Classloader 360 to enable a hot rollback of the Agent, as discussed below.

To complete the update to the new Agent, the byte code for the Application will be changed (e.g., instrumented) to reference the AgentShim 354 for the new Agent rather than the AgentShim 208 for the old Agent. In other words, the probes 354 of the Managed Application 352 (see FIG. 3) should (in this embodiment) point to the new Agent rather than the old Agent. In that regard, block 582 includes Class File Transformer 344 sending a request to the JVM to reload all previously instrumented class files for the Managed Application. In block 584, the JVM identifies a class file that needs to be loaded. In block 586, the JVM instruct Bootstrap Classloader 342 (or a different classloader) to load that identified class file. In block 588, the Bootstrap Classloader 342 reads the identified class into a buffer. In block 590, the Bootstrap Classloader 342 send the byte code for that class to appropriate Class File Transformer 344. In block 592, Class File Transformer 344 dynamically instruments the byte code of the class file to change the calls from pointing to the old AgentShim 208 to the new AgentShim 354 for the updated Agent. In block 594, the Class File Transformer 344 returns the instrumented byte code to the Bootstrap Classloader 342. In block 596, the Bootstrap Classloader 342 submits the instrumented byte code to the JVM 250. If there are more class files (block 598), then the process loops back to block 584. If all the class files of the Application have been instrumented, then the update is complete (block 600), and the Application runs with the updated Agent in block 600.

The above described process, using dynamic byte code instrumentation to substitute the byte code of the updated Agent (not in the class path for the Agent) for the byte code of the existing Agent (in the class path for the Agent), allows the Agent to be updated while agent.jar is locked, while the Application is running (without stopping or restarting the Application) and while the JVM is running (without stopping or restarting the JVM).

Although not desired, there are times when an update can cause problems or unwanted issues. In such a circumstance, it may be necessary to roll back the Agent to a previously known acceptable version. FIG. 8 is a flowchart describing one process for rolling back the Agent to use a previous version of code for the Agent. The previous version could have a lot of code that is different than the current version or just a small amount of code that is different than the current version. The rollback is considered a hot rollback because the Agent is rolled back to a previous version while the JVM and managed Application continue to run (without stopping them and without restarting them). In block 70 of FIG. 8, an error, bug or performance issue may occur. Note that the rollback can be performed even if there are no errors, bugs or performance issues In block 752, the Update Manager (or other entity), will (automatically or manually) determine that a rollback is needed. In some embodiments, human operator determines that a rollback is needed and instruct Update Manager 260 to make the rollback happen. In other embodiments, a monitoring process makes the determination automatically and instruct Update Manager 260 to make the change. In some embodiments, Update Manager 260 can include logic to automatically determine whether a rollback should happen. In block 754, Update Manager 260 instructs Class File Transformer 344 to rollback the Agent to a previous version of the Agent (e.g. use a previous version of code for the Agent).

In block 756, in response to the instruction from Update Manager 260, Class File Transformer 344 sends a request to the JVM to reload all previously instrumented class files for the Application. In block 758, the JVM identifies a class file that needs to be loaded. In block 760, the JVM instructs Bootstrap Classloader 342 to load that identified class file. In block 762, Bootstrap Classloader 342 reads the identified class file into a buffer. In block 764, Bootstrap Classloader 342 sends the byte code for the class file to Class File Transformer 344. In block 766, Class File Transformer 344 dynamically instruments the byte code for the class file that was provided to it. This dynamic instrumentation includes changing all invocations of methods in AgentShim 354 to invocations of methods in AgentFallbackShim 356. In block 768, Class File Transformer 344 returns the instrumented byte code to Bootstrap Classloader 342. In block 770, Bootstrap Classloader 342 submits the instrumented byte code to JVM 250. If there are more class files in the managed Application that need to be instrumented (block 772), then the process loops back to block 758; otherwise, the JVM continue running the managed Application, but with the newly loaded previous version of the Agent (in block 774).

FIG. 8 describes a process where the probes 254 in the managed Application are re-pointed from AgentShim to AgentFallbackShim By changing where the probes 254 are pointing to, the Managed Application will now access the Previous Agent Classes 362 that are invoked by AgentFallbackShim; therefore, the Managed Application will now be running with the previous version of the Agent. This process allows for a hot rollback of the code of the Agent while the JVM and the managed Application are running (without stopping them or restarting them).

Figure 9:
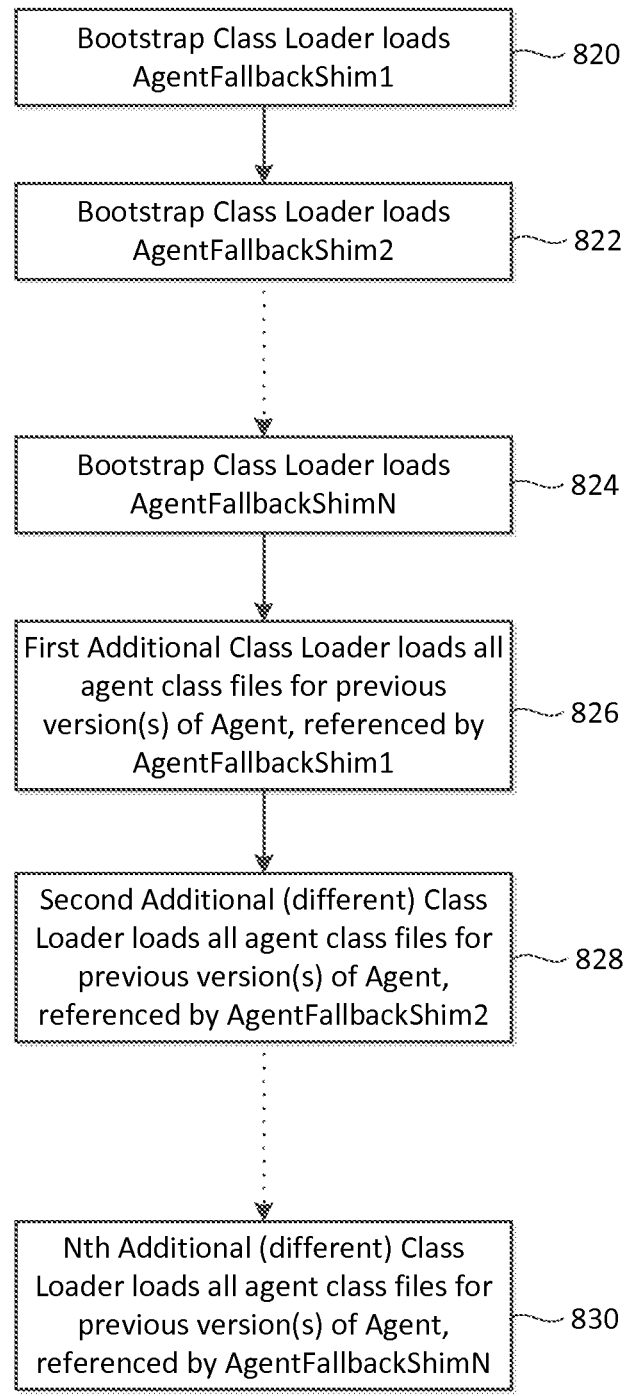
FIG. 9 depict a flow chart describing portion of another embodiment of a process for updating an Agent.
Figure 10:
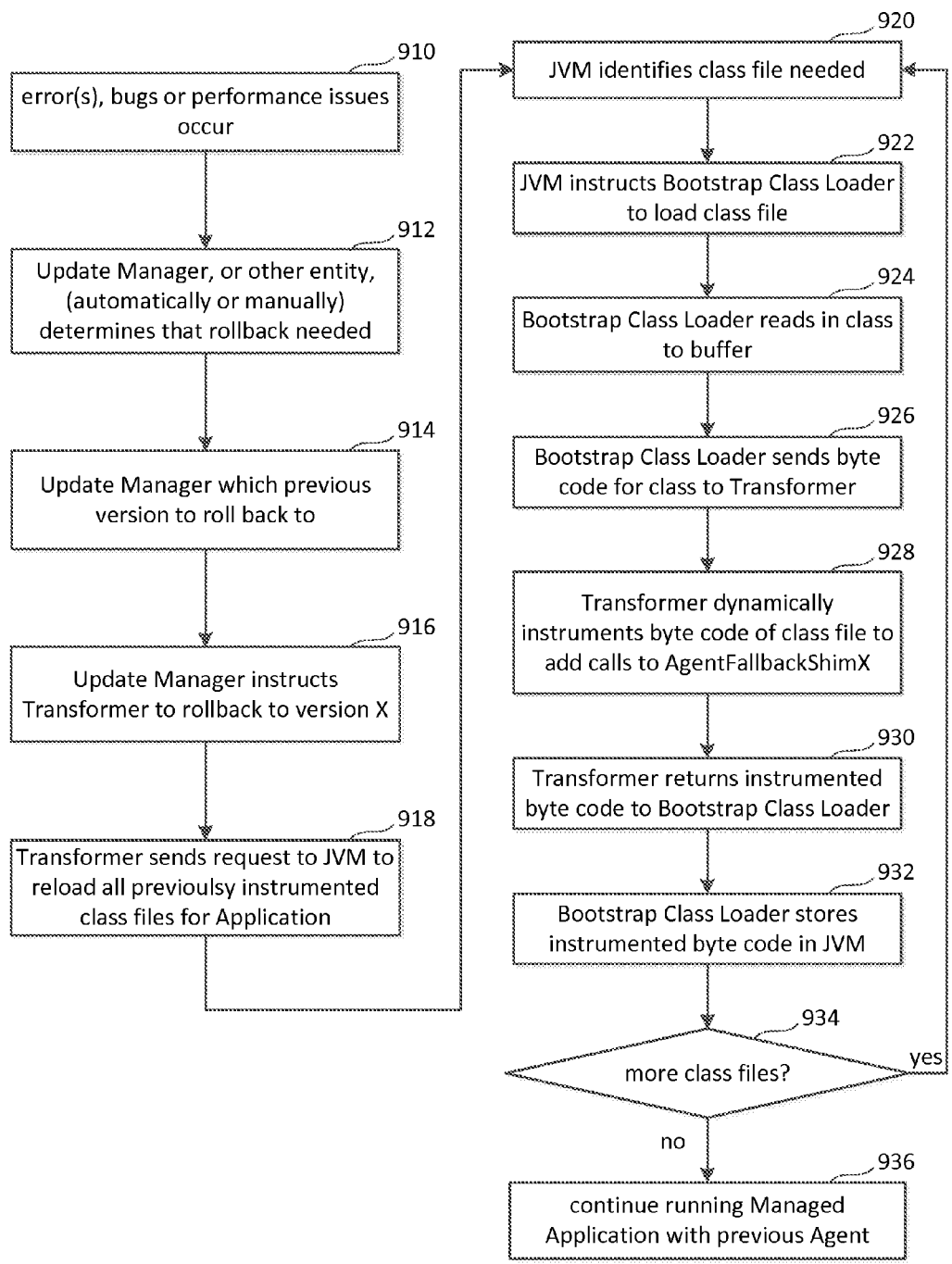
FIG. 10 is a flow chart describing one embodiment of a process for rolling back an Agent, in conjunction with the process of FIG. 9.

FIGS. 9 and 10 describe another embodiment for rolling back the Agent, in which a Java runtime environment will have multiple previous versions of the Agent to choose from. The process depicted in FIG. 9 replaces (or augments) blocks 578 and 580 of FIG. 7B in order to load multiple AgentFallbackShims For example, in block 820 Bootstrap Classloader 342 loads AgentFallbackShim1, in block 822 Bootstrap Classloader 342 loads AgentFallbackShim2, . . . , in block 824 Bootstrap Classloader loads AgentFallbackShimN. Thus, N AgentFallbackShims will be loaded. In one embodiment, Bootstrap Classloader 342 load all the Fallback Shims (simultaneously, serially or other). In other embodiments, different classloaders can load the different AgentFallbackShims. In one embodiment, all the AgenFallbackShims will be in a single agent.jar, while in other embodiments, the different AgentFallbackShims can be in different agent.jars.

In block 826 of FIG. 9 a First Additional Classloader loads the Agent Class files for the previous version of the Agent referenced by AgentFallbackShim 1, in block 828 a Second Additional Classloader loads the Agent Class files for the previous version of the Agent referenced by AgentFallbackShim 2, . . . in block 830 the Nth Additional Classloader loads the Agent files to the previous version for the Agent referenced by AgentFallbackShim N. Thus, for each AgentFallbackShim loaded, a set of class files pointed to by the respective AgentFallbackShim will also be loaded. Since each of the sets of class files will have the same package names, in one embodiment that are loaded by different classloaders so that they will be in different name spaces. In other embodiments, the names of the class files can be changed so that they can be loaded in the same name space.

FIG. 10 describes a process for performing a hot rollback in conjunction with the embodiment of FIG. 9. Many of the blocks of FIG. 10 are similar to the blocks of FIG. 8. In block 910, error, bug or performance issue can occur. In block 912, Update Manager 260 (or other entity) will (automatically or manually) determine that a rollback is needed. In block 914, Update Manager 260 (or another entity), determines which previous version to rollback to. For example, FIG. 9 teaches that there are N versions of the Agent that can be rolled back to. In block 914, an Update Manager determines which of the N versions to rollback to. In one embodiment, Update Manager determines which version to rollback to automatically (by determining the last version that worked without an error) or a human can manually tell the Update Manager which version to rollback to. Note that the Agent can be rolled back even if no error, bug or performance issue occurs.

At block 916, Update Manager 260 instructs Class File Transformer 344 to rollback to the chosen version (referred to in the flowchart as version X). In block 918, Class File Transformer 344 sends a request to the JVM to reload previously instrumented classes for the Application. In block 920, the JVM identifies a class file needed from the Application. In block 922, the JVM instructs Bootstrap Classloader 342 to load that class. In block 924, Bootstrap Classloader 342 reads the identified class into a buffer. In block 926, Bootstrap Classloader 342 sends the byte code for that class to Class File Transformer 344. In block 928, the Class File Transformer 344 (or another Class File Transformer) dynamically instruments the byte code for the class file provided to it by changing the calls that invoked methods in AgentShim to invoked methods in AgentFallbackShim X. In block 930, Class File Transformer 930 returns the instrumented byte code to the Bootstrap Classloader 342. If there are more class files to instrument (block 934), then the process loops back to block 920; otherwise, the system continues running the managed Application, but with the previous Agent (in block 936).

As can be seen, the process of FIG. 10 provides a customized hot rollback to one previous Agent of the many possible previous Agents, while the managed Application and the JVM are running (without stopping or restarting them) and while the agent.jar file is locked by injecting byte code into class file for the Agent from a jar file not in the Agent class path.

Figure 11:
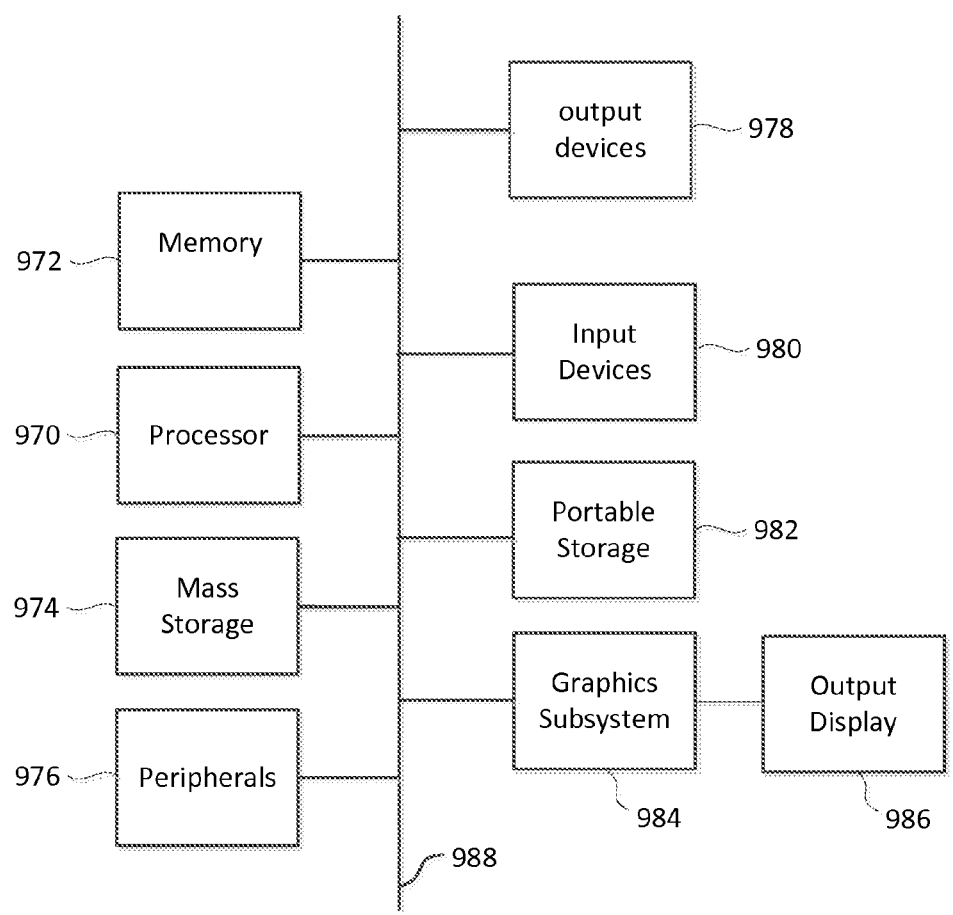
FIG. 11 is a block diagram of an example of a suitable computing device for use with the technology described herein.

FIG. 11 illustrates a high level block diagram of a computer system which can be used to implement the technology described above. The computer system of FIG. 11 includes a processor unit 970 in communication with main memory 972. Processor unit 970 may contain a single microprocessor, or may contain a plurality of microprocessors for configuring the computer system as a multi-processor system. These one or more processors can perform the methods described above. Main memory 972 stores, in part, instructions and data for execution by processor unit 970. If the system described herein is wholly or partially implemented in software, main memory 972 can store the executable code when in operation. Main memory 972 may include banks of dynamic random access memory (DRAM) as well as high speed cache memory. For example, main memory 972 can store the Agent.jar file, the updated and previous Agent.jar files, Application code 202, Agent code 204, the code to run JVM 250 and/or the code to run Application server 200.

In one embodiment, main memory 972 (or storage device) stores code including a first storage unit of code, which can (in some embodiments) be an Agent.jar file. The one or more processors 970 run a Java Application and an Agent for the Java Application such that the Agent is implemented using a -javaagent option of the Java instrumentation API. The first storage unit of code stores code for a class of the Agent. While the Application is running the one or more processors lock the first storage unit of code. While the first storage unit of code is locked and the Application and JMV are running, the Agent is updated by substituting new code for old code of the Agent.

The system of FIG. 11 further includes a mass storage device 974, peripheral device(s) 976, user input device(s) 980, output devices 978, portable storage medium drive(s) 982, a graphics subsystem 984 and an output display 986. For purposes of simplicity, the components shown in FIG. 11 are depicted as being connected via a single bus 988. However, the components may be connected through one or more data transport means. For example, processor unit 970 and main memory 972 may be connected via a local microprocessor bus, and the mass storage device 974, peripheral device(s) 976, portable storage medium drive(s) 982, and graphics subsystem 984 may be connected via one or more input/output (I/O) buses. Mass storage device 974, which may be implemented with a magnetic disk drive or an optical disk drive, is a non-volatile storage device for storing data and instructions for use by processor unit 970. In one embodiment, mass storage device 974 stores the system software for implementing the technology described herein for purposes of loading to main memory 572. Mass storage device 974 can also be used to store the current, updated and previous Agent.jar files. Peripheral device(s) 976 may include any type of computer support device, such as an input/output (I/O) interface, to add additional functionality to the computer system. For example, peripheral device(s) 976 may include a network interface for connecting the computer system to a network, a modem, a router, etc. User input device(s) 980 provides a portion of a user interface (e.g., for Update Manager 260). User input device(s) 980 may include an alpha-numeric keypad for inputting alpha-numeric and other information, or a pointing device, such as a mouse, a trackball, stylus, or cursor direction keys. In order to display textual and graphical information, the computer system of FIG. 11 includes graphics subsystem 984 and output display 986. Output display 986 may include a cathode ray tube (CRT) display, liquid crystal display (LCD) or other suitable display device. Graphics subsystem 984 receives textual and graphical information, and processes the information for output to display 986. Additionally, the system of FIG. 11 includes output devices 978. Examples of suitable output devices include speakers, printers, network interfaces, monitors, etc.

The components contained in the computer system of FIG. 6 are those typically found in computer systems suitable for use with the technology described herein, and are intended to represent a broad category of such computer components that are well known in the art. Thus, the computer system of FIG. 11 can be a personal computer, mobile computing device, smart phone, tablet, workstation, server, minicomputer, mainframe computer, or any other computing device. The computer can also include different bus configurations, networked platforms, multi-processor platforms, etc. Various operating systems can be used The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method of updating an Agent for an Application, comprising:
    running the Agent for the Application while the Application is running, the Agent is associated with an identified source of class files defining code for the Agent, the Agent is implemented using an Instrumentation API, the Agent registers a Transformer that updates the Agent by dynamically instrumenting byte code for the Agent;
    locking the identified source of class files defining code for the Agent by locking a first storage unit, the first storage unit stores code for the Agent and the Transformer in a class path;
    updating the code for the Agent by the Transformer while the first storage unit is locked and the Agent associated with the identified source of class file is running, the Transformer accessing updated code for the Agent from a second storage unit different than the first storage unit, the first storage unit is in the class path for the Agent and the second storage unit is not in the class path for the Agent; and
    running an updated Agent based on the updated code in the second storage unit;
    wherein the Application is instrumented to include probes to invoke various methods of the Agent.

2. The method of claim 1, wherein:
    the Agent is run in a Virtual Machine and uses classes loaded by a Bootstrap Classloader.

3. The method of claim 1, wherein:
    the Agent is implemented using a-java agent option of an Instrumentation API.

4. The method of claim 1, wherein:
    the identified source of class files is an Agent.jar file;
    the Agent is defined by first code in the Agent.jar file;
    the locking the identified source of class files defining code for the Agent comprises locking the Agent.jar file; and
    the updating the code for the Agent comprises providing replacement code for the first code in the Agent.jar file while the Agent.jar file is locked.

5. The method of claim 1, wherein:
    the updating the Agent is performed while the Application is running.

6. The method of claim 5, wherein:
    the Agent and the Application are running in a Virtual Machine; and
    the updating the Agent is performed while the Virtual Machine is running.

7. The method of claim 1, wherein:
    the updating the Agent comprises dynamically instrumenting current code for the Agent to insert new code into one or more classes for the Agent, the new code is from an accessible other source, the accessible other source not in a class path for the identified source of class files defining code for the Agent.

8. The method of claim 1, further comprising:
loading the code for the Agent into a Virtual machine from the first storage unit;
the locking the identified source of class files defining code for the Agent comprises locking the first storage unit;
providing an instruction to the Transformer to update the Agent.

9. The method of claim 8, wherein the updating the Agent comprises:
(a) the Virtual Machine requesting that the Bootstrap Classloader load the code for the Agent;
(b) the Bootstrap Classloader providing the code for the Agent to the particular Transformer;
(c) the Transformer providing the updated code to the Bootstrap Classloader as an instrumented version of the code far the Agent; and
(d) the Bootstrap Classloader providing the updated code to the Virtual Machine as the byte code for Agent.

10. The method of claim 9, wherein:
steps (a)-(d) are performed separately for all classes of the Agent.

11. The method of claim 9, wherein the updating the Agent further comprises:
dynamically instrumenting already-instrumented classes of the Application to reference the updated code, while the Application is running.

12. The method of claim 9, wherein the updating the Agent comprises:
the Transformer checking updated code for the Agent to determine whether there is an updated Transformer; and
if there is an updated Transformer, then:
loading the updated Transformer,
registering the updated Transformer, and
unregistering the Transformer.

13. The method of claim 1 wherein the running the updated Agent for the Application includes loading a first shim for the updated Agent, a second shim for the Agent, classes referenced by the first shim and classes referenced by the second shim, and wherein running the updated Agent includes executing the Agent based on the calls from the Application to the first shim and the classes referenced by the first shim.

14. A method of updating an Agent for an Application, comprising:
running the Application in a Virtual Machine;
running the Agent in the Virtual Machine while the Application is running, the Agent is implemented using an Instrumentation API, the Agent registers a Transformer that updates the Agent by dynamically instrumenting byte code for the Agent;
locking a source of class files defining the Agent, the source of class files defining the Agent and the Transformer in a class path;
updating the Agent without re-starting the Application and the Virtual Machine, the updating the Agent further comprises updating code for the Agent by the Transformer while the source of the class files is locked and the Agent is running, the Transformer accessing updated code for the Agent from an accessible other source of class files different than the source of class files, the source of class files in a class path for the Agent and the accessible other source of class files is not in the class path for the Agent; and
running the updated Agent based on the updated code for the Agent in the accessible other source of class flies in parallel with the Application;
wherein the Application is instrumented to include probes to invoke various methods of the Agent.

15. The method of claim 14, wherein:
the Agent is implemented using a java agent option of an Instrumentation API.

16. The method of claim 14, wherein the method further comprising:
loading, code for the Agent into the Virtual machine from the source of the class files;
providing an instruction to the particular Transformer to update the Agent.

17. The method of claim 16, wherein the updating the Agent comprises:
(a) the Transformer requesting that code for the Agent be loaded;
(b) the Virtual Machine requesting that a Classloader load the code for the Agent;
(c) the Classloader providing the code for the Agent to the Transformer;
(d) the Transformer accessing updated code from the accessible other source of class files on an update storage unit different than the source of the class files;
(e) the Transformer providing the updated code to the Classloader as an instrumented version of the code for the Agent; and
(f) the Classloader providing the updated code to the Virtual Machine as the byte code for Agent.

18. The method of claim 17, wherein:
steps (b)-(f) are performed separately for all classes of the Agent.

19. The method of claim 17, wherein the updating the Agent further comprises:
dynamically instrumenting already-instrumented classes of the Application to reference the updated code, while the Application is running.

20. A computing apparatus, comprising:
a storage device that stores code comprising a first storage unit of code; and
one or more processors in communication with the storage device, the one or more processors run an Application and an Agent for the Application such that the Agent is implemented using a -javaagent option of an instrumentation API and the Agent registers a Transformer that updates the Agent by dynamically instrumenting byte code for the Agent, the first storage unit of code stores code for a class of the Agent and the Transformer in a class path, while the Application and the Agent are running the one or more processors lock the first storage unit of code, while the first storage unit of code is locked the Agent is updated by the Transformer substituting new code from a second storage unit different than the first storage unit while the Agent is running, the first storage unit is in the class path for the Agent and the second story e unit is not in the class path for the Agent, the one or more processors run the Agent based on the new code from the second storage unit.

21. The computing apparatus of claim 20, wherein:
the old code for the Agent was loaded by a Bootstrap Classloader for a Virtual Machine running the Application; and the Agent is updated by the one or more processors dynamically instrumenting byte code for the Agent while the Application and the Virtual Machine are running.

22. The computing apparatus of claim 20, wherein:
the one or more processors implement the Transformer;
an instruction is provided to the Transformer to update the Agent.

23. The computing apparatus of claim 22, wherein:
a Virtual Machine requests that a Classloader load the code for the Agent;
the Classloader provides the code for the Agent to the Transformer;
the Transformer accesses updated code from the second storage unit
the Transformer provides the updated code to the Classloader as an instrumented version of the code for the Agent; and
the Classloader provides the updated code to the Virtual Machine as the byte code for Agent.

24. The computing apparatus of claim 23, wherein:
the one or more processors dynamically instrument already-instrumented classes of the Application to reference the updated code, while the Application is running.

25. A computer program product, comprising:
a computer readable storage medium having computer readable program code embodied thereon, the computer readable program code comprising:
  computer readable program code configured to implement an Agent to run for an Application, the Agent is implemented using a -javaagent option of an Instrumentation API, the Agent registers a Transformer that updates the Agent by dynamically instrumenting byte code for the Agent, the computer readable program code configured to store the Agent and the Transformer in a first source of class files in a first class path;
  computer readable program code configured to dynamically instrument the Application to run with the Agent; and
  computer readable program code configured to implement the Transformer to update the computer readable program code configured to implement the Agent while the first source of class files is locked and the Agent is running, the Transformer accesses updated code for the Agent from a second source of class files different than the first source of class files
  the first source of class files is in a class path for the Agent and the second source of class files is not in the class path for the Agent.

26. The computer program product of claim 25, wherein:
the Agent and Application run in a Virtual Machine; and
the computer readable program code configured to update causes classes for the Agent loaded by a Bootstrap Classloader to be dynamically instrumented.

27. The computer program product of claim 25, wherein:
the computer readable program code configured to update will update the computer readable program code configured to implement the Agent while the Application and Virtual Machine are running.

* * * * *